US010520026B2

(12) United States Patent
Uneura

(10) Patent No.: US 10,520,026 B2
(45) Date of Patent: Dec. 31, 2019

(54) BEARING STRUCTURE AND TURBOCHARGER

(71) Applicant: IHI Corporation, Koto-ku (JP)

(72) Inventor: Yutaka Uneura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/969,998

(22) Filed: May 3, 2018

(65) Prior Publication Data
US 2018/0252265 A1 Sep. 6, 2018

Related U.S. Application Data

(63) Continuation of application No. PCT/JP2016/082805, filed on Nov. 4, 2016.

(30) Foreign Application Priority Data

Nov. 13, 2015 (JP) .................. 2015-223075

(51) Int. Cl.
*F16C 33/10* (2006.01)
*F16C 17/10* (2006.01)
(Continued)

(52) U.S. Cl.
CPC ........ *F16C 33/1045* (2013.01); *F01D 25/166* (2013.01); *F01D 25/18* (2013.01);
(Continued)

(58) Field of Classification Search
CPC ...... F16C 17/10; F16C 17/107; F16C 17/245; F16C 17/26; F16C 27/02; F16C 33/1065;
(Continued)

(56) References Cited

U.S. PATENT DOCUMENTS 3,043,636 A * 7/1962 MacInnes .............. F01D 25/166
384/287
4,358,253 A * 11/1982 Okano .................. F01D 25/166
384/368

(Continued)

FOREIGN PATENT DOCUMENTS

CN 103398095 A 11/2013
CN 104271921 A 1/2015
(Continued)

OTHER PUBLICATIONS

International Preliminary Report on Patentability and Written Opinion dated May 24, 2018 in PCT/JP2016/082805 (English Translation only), 9 pages.

(Continued)

*Primary Examiner* — Marcus Charles
(74) *Attorney, Agent, or Firm* — Oblon, McClelland, Maier & Neustadt, L.L.P.

(57) ABSTRACT

Provided is a bearing structure, including: a bearing housing having a bearing hole; a main body portion, which is provided in the bearing hole, and receives a shaft inserted to the main body portion; a damper portion formed on an outer circumference surface of the main body portion; a radial bearing surface formed on an inner circumference surface of the main body portion; a thrust bearing surface formed on one end surface of the main body portion in an axial direction of the shaft; a communication hole, which has one end opened in a gap between an outer circumference surface of the main body portion and an inner circumference surface of the bearing hole or in the damper portion, and has another end opened in the thrust bearing surface, in the radial bearing surface, or between the thrust bearing surface and the radial bearing surface.

9 Claims, 3 Drawing Sheets

(51) Int. Cl.
*F16C 27/02* (2006.01)
*F01D 25/16* (2006.01)
*F01D 25/18* (2006.01)
*F02B 39/14* (2006.01)

(52) U.S. Cl.
CPC .............. *F16C 17/10* (2013.01); *F16C 27/02* (2013.01); *F02B 39/14* (2013.01); *F05D 2220/40* (2013.01); *F05D 2220/50* (2013.01); *F16C 2226/62* (2013.01); *F16C 2360/24* (2013.01)

(58) Field of Classification Search
CPC .............. F16C 33/1085; F16C 2360/24; F16C 2226/62; F16C 33/1045; F16C 17/246; F01D 25/166; F01D 25/18; F04D 25/062; F05D 2240/50; F05D 2220/50; F02B 39/14
USPC ....... 384/107, 129, 282–283, 286, 606, 901; 425/111, 229; 415/111, 229
See application file for complete search history.

(56) References Cited

U.S. PATENT DOCUMENTS

| | | | | |
|---|---|---|---|---|
| 4,902,144 | A * | 2/1990 | Thoren | F01D 25/166 384/287 |
| 4,997,290 | A | 3/1991 | Aida | |
| 6,053,636 | A * | 4/2000 | Pelfrey | F04D 29/047 384/100 |
| 6,250,897 | B1 * | 6/2001 | Thompson | F01D 25/164 184/6.11 |
| 6,905,316 | B2 * | 6/2005 | Parker | F01D 25/164 417/407 |
| 7,189,005 | B2 * | 3/2007 | Ward | F01D 25/166 384/286 |
| 8,075,191 | B2 * | 12/2011 | Gutknecht | F01D 25/16 384/292 |
| 8,534,989 | B2 * | 9/2013 | Groves | F01D 25/166 415/111 |
| 9,494,047 | B2 * | 11/2016 | Schumnig | F01D 25/16 |
| 2003/0026715 | A1 * | 2/2003 | Ojima | F01D 25/166 417/407 |
| 2011/0176907 | A1 | 7/2011 | Groves et al. | |
| 2014/0219777 | A1 * | 8/2014 | Uneura | F01D 25/186 415/112 |
| 2015/0267740 | A1 * | 9/2015 | Ryu | F01D 25/16 384/103 |

FOREIGN PATENT DOCUMENTS

| | | | |
|---|---|---|---|
| CN | 104975941 A | 10/2015 | |
| DE | 102 38 415 A1 | 3/2004 | |
| JP | 52-085054 U | 6/1977 | |
| JP | 59-142426 U | 9/1984 | |
| JP | 02-066717 U | 5/1990 | |
| JP | 11-036878 | 2/1999 | |
| JP | 2005-133635 | 5/2005 | |
| JP | 4407780 B2 * | 2/2010 | .............. F16C 35/02 |
| JP | 2013-227892 | 11/2013 | |
| JP | 5337227 B2 * | 11/2013 | .............. F16C 17/18 |
| JP | 2014-009701 | 1/2014 | |
| JP | 5510592 | 6/2014 | |
| WO | WO 2004/018843 A2 | 3/2004 | |

OTHER PUBLICATIONS

International Search Report dated Jan. 24, 2017 in PCT/JP2016/082805 filed Nov. 4, 2016 (with English Translation).
Written Opinion dated Jan. 24, 2017 in PCT/JP2016/082805 filed Nov. 4, 2016.

* cited by examiner

BEARING STRUCTURE AND TURBOCHARGER

CROSS REFERENCE TO RELATED APPLICATIONS

This application is a continuation application of International Application No. PCT/JP2016/082805, filed on Nov. 4, 2016, which claims priority to Japanese Patent Application No. 2015-223075, filed on Nov. 13, 2015, the entire contents of which are incorporated by reference herein.

BACKGROUND ART

Technical Field

The present disclosure relates to a bearing structure supporting a shaft, and a turbocharger.

Related Art

Hitherto, there has been known a turbocharger in which a shaft is axially supported so as to be rotatable in a bearing housing. A turbine impeller is provided at one end of the shaft, and a compressor impeller is provided at another end of the shaft. The turbocharger is connected to an engine. The turbine impeller is rotated by exhaust gas discharged from the engine. The rotation of the turbine impeller causes the compressor impeller to rotate through the shaft. The turbocharger compresses air along with the rotation of the compressor impeller and delivers the compressed air to the engine.

In Patent Literature 1, there is described a configuration in which a semi-floating bearing is received in a bearing hole. The semi-floating bearing includes an annular main body portion. The bearing hole is formed in a bearing housing. On an inner circumference surface of the main body portion of the semi-floating bearing, there are formed two radial bearing surfaces. The two radial bearing surfaces are separated apart from each other in an axial direction. In the inner circumference surface of the bearing hole, an oil hole is opened between the two radial bearing surfaces. Part of lubricating oil supplied to the bearing hole enters a gap between the bearing hole and the main body portion to contribute to suppression of oscillation. Part of the lubricating oil supplied to the bearing hole flows through the oil hole to the inner circumference surface side to lubricate the radial bearing surfaces. Further, when both end surfaces of the main body portion function as thrust bearing surfaces, opposing portions which rotate integrally with the shaft are provided so as to be opposed to the both end surfaces of the main body portion in the axial direction. The lubricating oil having lubricated the radial bearing surface flows out from the both end surfaces to lubricate the thrust bearing surfaces.

CITATION LIST

Patent Literature

Patent Literature 1: Japanese Patent No. 5510592 B2

SUMMARY

Technical Problem

When the both end surfaces of the main body portion of the semi-floating bearing function as the thrust bearing surfaces as described above, the lubricating oil which is present in a clearance formed between the thrust bearing surface and the opposing portion is rotated together with the opposing portion. The lubricating oil is discharged to a radially outer side by a centrifugal force. At this time, the lubricating oil which is present in a clearance between the radial bearing surface and shaft is also sucked out to the thrust bearing surface side. As a higher rotation speed of the shaft is required in the future, the pressure for sucking out the lubricating oil from the radial bearing surface side to the thrust bearing surface side also increases. Therefore, there is a fear in that an oil film thickness of the lubricating oil for lubricating the radial bearing surface is reduced.

An object of the present disclosure is to provide a bearing structure and a turbocharger, which are capable of securing a sufficient oil film thickness of lubricating oil for lubricating the radial bearing surface even when the rotation speed of the shaft becomes higher.

Solution to Problem

In order to solve the above-mentioned problem, according to one mode of the present disclosure, there is provided a bearing structure, including: a housing having a bearing hole; a main body portion, which is provided in the bearing hole, and receives a shaft inserted to the main body portion; a damper portion formed on an outer circumference surface of the main body portion; a radial bearing surface formed on an inner circumference surface of the main body portion; a thrust bearing surface formed on one end surface of the main body portion in an axial direction of the shaft; a communication hole, which has one end opened in a gap between an outer circumference surface of the main body portion and an inner circumference surface of the bearing hole or in the damper portion, and has another end opened in the thrust bearing surface, in the radial bearing surface, or between the thrust bearing surface and the radial bearing surface.

There may be further included an oil hole, which is formed on a side of the main body portion opposite to the thrust bearing surface with respect to the radial bearing surface, and penetrates from an inner circumference surface to an outer circumference surface of the main body portion.

There may be further included an oil passage, which is formed in the housing, is opened in the bearing hole, and is formed at a position closer to the oil hole in the axial direction of the shaft with respect to the radial bearing surface.

The oil passage may be opposed to at least a part of the oil hole.

The one end of the communication hole may be opened at a position of the main body portion separated apart from the thrust bearing surface with respect to the damper portion.

The another end of the communication hole may be opened on an innermost side of the thrust bearing surface in the radial direction of the shaft.

In order to solve the above-mentioned problem, according to one mode of the present disclosure, there is provided a turbocharger, including the above-mentioned bearing structure.

Effects of Disclosure

According to the present disclosure, it is possible to secure a sufficient oil film thickness of lubricating oil for lubricating the radial bearing surface even when the rotation speed of the shaft becomes higher.

DESCRIPTION OF EMBODIMENT

Figure 1:
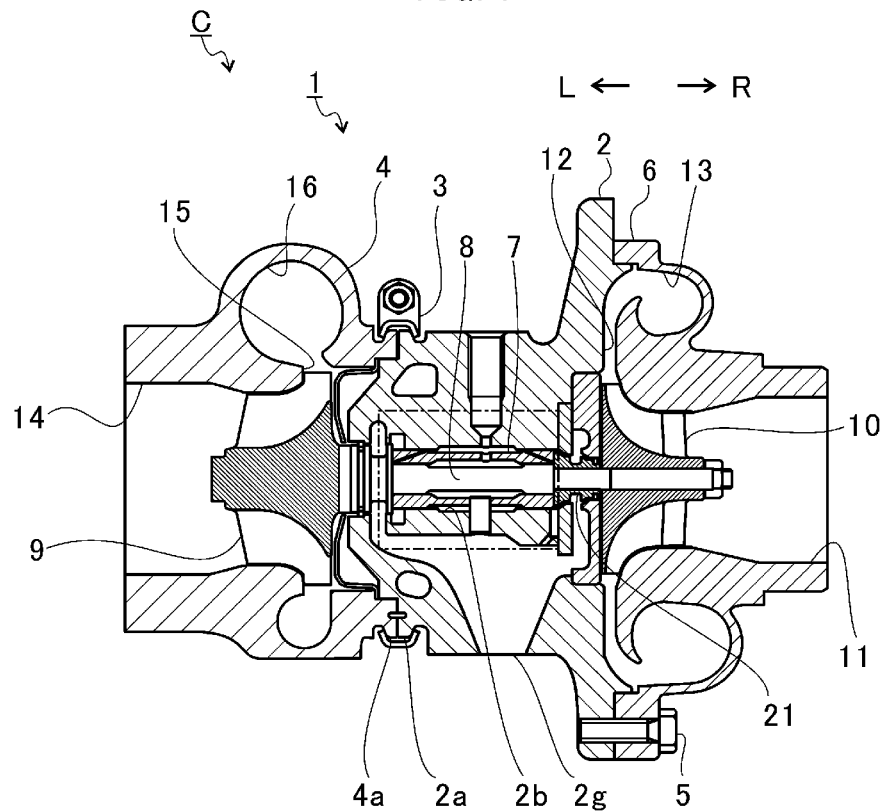
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating the understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C, and the direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2 (housing). A turbine housing 4 is coupled to the left side of the bearing housing 2 by a fastening mechanism 3. A compressor housing 6 is coupled to the right side of the bearing housing 2 by a fastening bolt 5. The bearing housing 2, the turbine housing 4, and the compressor housing 6 are integrally formed.

On an outer circumference surface of the bearing housing 2, there is formed a projection 2a. The projection 2a is formed in the vicinity of the turbine housing 4. The projection 2a projects in a radial direction of the bearing housing 2. Further, on an outer circumference surface of the turbine housing 4, there is formed a projection 4a. The projection 4a is formed in a vicinity of the bearing housing 2. The projection 4a projects in a radial direction of the turbine housing 4. The bearing housing 2 and the turbine housing 4 are fixed to each other by band-fastening the projections 2a and 4a with the fastening mechanism 3. The fastening mechanism 3 is constructed by, for example, a G-coupling for clamping the projections 2a and 4a.

The bearing housing 2 has a bearing hole 2b. The bearing hole 2b penetrates in a right-and-left direction of the turbocharger C. A semi-floating bearing 7 is provided in the bearing hole 2b. A shaft 8 is axially supported so as to be rotatable by the semi-floating bearing 7. A turbine impeller 9 is provided to a left end portion of the shaft 8. The turbine impeller 9 is received in the turbine housing 4 so as to be rotatable. Further, a compressor impeller 10 is provided to a right end portion of the shaft 8. The compressor impeller 10 is received in the compressor housing 6 so as to be rotatable.

The compressor housing 6 has a intake port 11. The intake port 11 is opened on the right side of the turbocharger C. The intake port 11 is connected to an air cleaner (not shown). Further, as described above, under a state in which the bearing housing 2 and the compressor housing 6 are coupled to each other by the fastening bolt 5, a diffuser flow passage 12 is formed. The diffuser flow passage 12 is formed of opposed surfaces of the bearing housing 2 and the compressor housing 6. In the diffuser flow passage 12, the air is increased in pressure. The diffuser flow passage 12 has an annular shape which extends from a radially inner side to an outer side of the shaft 8. The diffuser flow passage 12 communicates with the intake port 11 on the above-mentioned radially inner side through intermediation of the compressor impeller 10.

Further, the compressor housing 6 has a compressor scroll flow passage 13. The compressor scroll flow passage 13 has an annular shape. The compressor scroll flow passage 13 is positioned on the radially outer side of the shaft 8 with respect to the diffuser flow passage 12. The compressor scroll flow passage 13 communicates with a intake port of an engine (not shown). The compressor scroll flow passage 13 communicates also with the diffuser flow passage 12. Thus, when the compressor impeller 10 is rotated, air is sucked into the compressor housing 6 through the intake port 11. The sucked air is increased in speed by a centrifugal force during a course of flowing through blades of the compressor impeller 10. The air having been increased in speed, is increased in pressure in the diffuser flow passage 12 and the compressor scroll flow passage 13. The air increased in pressure is introduced to the intake port of the engine.

The turbine housing 4 has a discharge port 14. The discharge port 14 is opened on the left side of the turbocharger C. The discharge port 14 is connected to an exhaust gas purification device (not shown). Further, a flow passage 15 and a turbine scroll flow passage 16 are formed in the turbine housing 4. The turbine scroll flow passage 16 has an annular shape. The turbine scroll flow passage 16 is positioned on the radially outer side of the turbine impeller 9 with respect to the flow passage 15. The turbine scroll flow passage 16 communicates with a gas inflow port (not shown). The exhaust gas discharged from an exhaust gas manifold of the engine (not shown) is introduced to the gas inflow port. The gas inflow port communicates also with the flow passage 15. Thus, the exhaust gas introduced through the gas inflow port to the turbine scroll flow passage 16 is introduced to the discharge port 14 through the flow passage 15 and the turbine impeller 9. The exhaust gas to be introduced to the discharge port 14 causes the turbine impeller 9 to rotate during a course of flowing.

Then, a rotational force of the above-mentioned turbine impeller 9 is transmitted to the compressor impeller 10 through the shaft 8. The rotational force of the compressor impeller 10 causes the air to be increased in pressure and introduced to the intake port of the engine as described above.

Figure 2:
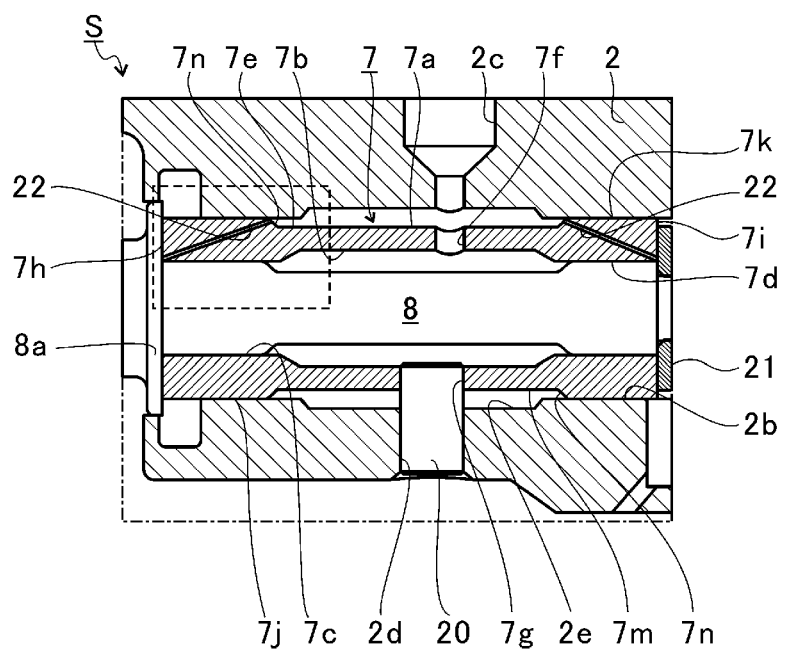
FIG. 2 is an extracted view of the one-dot chain line portion of FIG. 1.

FIG. 2 is an extracted view of the one-dot chain line portion of FIG. 1. As illustrated in FIG. 2, a bearing structure S includes the bearing housing 2. In the bearing structure S, an oil passage 2c is formed in the bearing housing 2. The oil passage 2c is opened in the bearing hole 2b. The lubricating oil flows into the bearing hole 2b from the oil passage 2c. The lubricating oil having flowed into the bearing hole 2b is supplied to the semi-floating bearing 7 provided in the bearing hole 2b.

The semi-floating bearing 7 includes an annular main body portion 7a. The shaft 8 is inserted to an inside (inner circumference surface 7b side) of the main body portion 7a. On an inner circumference surface 7b of the main body portion 7a, there are formed two radial bearing surfaces 7c and 7d. The two radial bearing surfaces 7c and 7d are separated apart from each other in an axial direction of the shaft 8 (hereinafter simply referred to as "axial direction").

An oil hole 7f is opened between the two radial bearing surfaces 7c and 7d in the inner circumference surface 7b. The oil hole 7f penetrates through the main body portion 7a from the inner circumference surface 7b to the outer circumference surface 7e. An opening of the oil passage 2c on the bearing hole 2b side is formed at a position closer to the oil hole 7f in the axial direction of the shaft 8 than the radial bearing surfaces 7c and 7d and a communication hole 22 described later. The opening of the oil passage 2c on the bearing hole 2b side has an inner diameter which is approximately equal to an inner diameter of the oil hole 7f. The opening of the oil passage 2c on the bearing hole 2b side is opposed to the oil hole 7f. However, the opening of the oil passage 2c on the bearing hole 2b side may have an inner diameter which is larger or smaller than an inner diameter of the oil hole 7f. Further, only a part of the opening of the oil passage 2c on the bearing hole 2b side may be opposed to the oil hole 7f. Further, the opening of the oil passage 2c on the bearing hole 2b side may be deviated in position in the axial direction without being opposed to the oil hole 7f. Part of the lubricating oil supplied to the bearing hole 2b is introduced by the oil hole 7f to the inner circumference surface 7b side from an outside of the main body portion 7a. The lubricating oil having been introduced to the inner circumference surface 7b side is supplied to a clearance between the shaft 8 and each of the radial bearing surfaces 7c and 7d. The shaft 8 is axially supported by an oil film pressure of the lubricating oil having been supplied to the clearance between the shaft 8 and each of the radial bearing surfaces 7c and 7d.

Further, the main body portion 7a has a through hole 7g. The through hole 7g penetrates through the main body portion 7a from the inner circumference surface 7b to the outer circumference surface 7e. The bearing housing 2 has a pin hole 2d. The pin hole 2d is formed at a portion opposed to the through hole 7g. The pin hole 2d penetrates through a wall portion forming the bearing hole 2b. A positioning pin 20 is press-fitted to pin hole 2d from a lower side in FIG. 2. A distal end of the positioning pin 20 is inserted to the through hole 7g of the semi-floating bearing 7. The positioning pin 20 regulates rotation and axial movement of the semi-floating bearing 7.

Further, an oil thrower member 21 is provided to the shaft 8. The oil thrower member 21 is arranged on the right side in FIG. 2 (compressor impeller 10 side) with respect to the main body portion 7a. The oil thrower member 21 is an annular member. The oil thrower member 21 causes the lubricating oil, which flows to the compressor impeller 10 side along the shaft 8, to be diffused to the radially outer side. That is, the oil thrower member 21 suppresses leakage of the lubricating oil to the compressor impeller 10 side.

The oil thrower member 21 is opposed to the main body portion 7a in the axial direction. An outer diameter of an opposed surface of the oil thrower member 21 with respect to the main body portion 7a is larger than an inner diameter of the radial bearing surface 7d. An outer diameter of the opposed surface of the oil thrower member 21 with respect to the main body portion 7a is smaller than an outer diameter of the main body portion 7a. The outer diameter of the opposed surface of the oil thrower member 21 with respect to the main body portion 7a is not limited to the configuration of being smaller than the outer diameter of the main body portion 7a. For example, in accordance with an operation condition of an engine to which the turbocharger C is mounted, the outer diameter of the opposed surface with respect to the main body portion 7a may be equal to the outer diameter of the main body portion 7a or may be larger than the outer diameter of the main body portion 7a.

Further, the shaft 8 has a large-diameter portion 8a. An outer diameter of the large-diameter portion 8a is larger than an inner diameter of the radial bearing surface 7c of the main body portion 7a. The outer diameter of the large-diameter portion 8a is larger than an outer diameter of the main body portion 7a. The large-diameter portion 8a is positioned on the left side in FIG. 2 (turbine impeller 9 side) with respect to the main body portion 7a. The large-diameter portion 8a is opposed to the main body portion 7a in the axial direction. The outer diameter of the large-diameter portion 8a is not limited to the configuration of being larger than the outer diameter of the main body portion 7a. For example, in accordance with an operation condition of an engine to which the turbocharger C is mounted, the outer diameter of the large-diameter portion 8a may be equal to the outer diameter of the main body portion 7a or may be smaller than the outer diameter of the main body portion 7a.

As described above, the axial movement of the main body portion 7a is regulated by the positioning pin 20. The main body portion 7a is arranged between the oil thrower member 21 and the large-diameter portion 8a in the axial direction. The lubricating oil is supplied to a clearance between the main body portion 7a and the oil thrower member 21. The lubricating oil is supplied to a clearance between the main body portion 7a and the large-diameter portion 8a. When the shaft 8 moves in the axial direction, the oil thrower member 21 or the large-diameter portion 8a is supported by an oil film pressure generated with the main body portion 7a. The axial movement of the shaft 8 is regulated by the semi-floating bearing 7. That is, in the semi-floating bearing 7, both end surfaces of the main body portion 7a in the axial direction are thrust bearing surfaces 7h and 7i. The thrust bearing surfaces 7h and 7i receive a thrust load. The oil hole 7f is formed on a side opposite to the thrust bearing surface 7h with respect to the radial bearing surface 7c. The oil hole 7f is formed on a side opposite to the thrust bearing surface 7i with respect to the radial bearing surface 7d (see FIG. 2).

Further, damper portions 7j and 7k are formed on both end sides of the outer circumference surface 7e of the main body portion 7a in the axial direction. The outer circumference surface 7e of the main body portion 7a has a small-diameter portion 7m between the damper portions 7j and 7k. The small-diameter portion 7m has an outer diameter smaller than an outer diameter of each of the damper portions 7j and 7k. The oil hole 7f is formed in the small-diameter portion 7m. Tapered surfaces 7n are formed between the small-diameter portion 7m and the damper portion 7j and between the small-diameter portion 7m and the damper portion 7k, respectively. The tapered surfaces 7n each increase in outer diameter from the small-diameter portion 7m side to the damper portions 7j and 7k. As described above, part of the lubricating oil supplied to the bearing hole 2b is introduced from the oil hole 7f to the inner circumference surface 7b of the main body portion 7a. Remainder of the lubricating oil passes through a gap between the outer circumference surface 7e of the main body portion 7a and the inner circumference surface 2e of the bearing hole 2b, and is introduced to the damper portions 7j and 7k. The damper portions 7j and 7k absorb (suppress) oscillation of the shaft 8 by the oil film pressure of the lubricating oil having been supplied to the gap formed with the circumference surface 2e of the bearing hole 2b.

Figure 3:
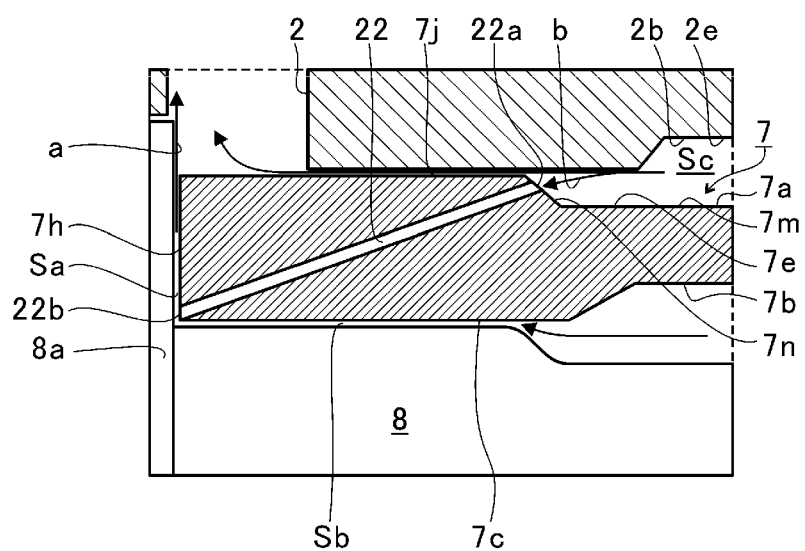
FIG. 3 is an extracted view of the broken line portion of FIG. 2.

FIG. 3 is an extracted view of the broken line portion of FIG. 2. However, in FIG. 3, for easy understanding, clearances Sa, Sb, and gap Sc through which the lubricating oil passes are illustrated with emphasis. In FIG. 3, a flow of the lubricating oil is indicated by arrows. Further, the structure on the thrust bearing surface 7h side and the structure on the thrust bearing surface 7i side are substantially the same. For the purpose of avoiding redundant description, the structure on the thrust bearing surface 7h side is described in detail.

As described above, the lubricating oil is interposed in the clearance Sa between the thrust bearing surface 7h and the large-diameter portion 8a. When the shaft 8 rotates, the lubricating oil in the clearance Sa is rotated together with the large-diameter portion 8a. The lubricating oil having been rotated together with the large-diameter portion 8a is discharged to the radially outer side by the centrifugal force indicated by the arrow "a" in FIG. 3.

The clearance Sb between the radial bearing surface 7c and the shaft 8 communicates with the clearance Sa. The lubricating oil in the clearance Sb is sucked out to the thrust bearing surface 7h (clearance Sa) side. Further, as the rotation speed of the shaft 8 becomes higher, the pressure for sucking out the lubricating oil from the radial bearing surface 7c side to the thrust bearing surface 7h side increases. As a result, the amount of the lubricating oil sucked out to the thrust bearing surface 7h side increases. Thus, for example, when a condition of supplying oil from the engine becomes harsher, there is a fear in that the oil film thickness of the lubricating oil for lubricating the radial bearing surface 7c becomes smaller.

Therefore, the communication hole 22 is formed in the main body portion 7a. A plurality of communication holes 22 are formed so as to be separated apart from each other in the circumferential direction of the main body portion 7a. The communication holes 22 are each a hole penetrating through a part of the main body portion 7a. One end 22a of the communication hole 22 is opened in the outer circumference surface 7e of the main body portion 7a. The one end 22a of the communication hole 22 is opened at a part on upstream (right side in FIG. 3) in a flow direction of the lubricating oil with respect to the damper portion 7j. In other words, as illustrated in FIG. 3, the one end 22a of the communication hole 22 is opened at a part closer to the oil passage 2c side with respect to the damper portion 7j. The one end 22a of the communication hole 22 is opened at a position separated apart from the thrust bearing surface 7h of the main body portion 7a with respect to the damper portion 7j. That is, the one end 22a of the communication hole 22 is opened between the two damper portions 7j and 7k. Further, the one end 22a of the communication hole 22 is opened in the tapered surface 7n of the outer circumference surface 7e, which connects the small-diameter portion 7m and the damper portion 7j to each other.

Part of the lubricating oil supplied to the bearing hole 2b flows in the gap Sc between the outer circumference surface 7e of the main body portion 7a and the inner circumference surface 2e of the bearing hole 2b. The gap Sc is, for example, a space between a part between the damper portions 7j and 7k of the outer circumference surface 7e of the main body portion 7a (outer circumference surface 7e excluding the damper portions 7j and 7k) and the inner circumference surface 2e of the bearing hole 2b. The part of the lubricating oil is introduced to the thrust bearing surface 7h through the communication hole 22 as indicated by the arrow "b" in FIG. 3.

Even when the lubricating oil is discharged by the centrifugal force in the direction indicated by the arrow "a", through formation of the communication holes 22, part of the lubricating oil supplied to the damper portion 7j is supplied to the thrust bearing surface 7h side. Therefore, the amount of the lubricating oil to be sucked out from the radial bearing surface 7c side to the thrust bearing surface 7h side is suppressed. As a result, even when the rotation speed of the shaft 8 becomes higher, a sufficient oil film thickness of the lubricating oil for lubricating the radial bearing surface 7c can be secured.

Further, as illustrated in FIG. 3, another end 22b of the communication hole 22 is opened in the thrust bearing surface 7h. Specifically, the another end 22b of the communication hole 22 is opened on the innermost side of the thrust bearing surface 7h in the radial direction of the shaft 8. The following effect is achieved by allowing the another end 22b of the communication hole 22 to be opened on the innermost side of the thrust bearing surface 7h in the radial direction of the shaft 8.

That is, the lubricating oil having flowed through the clearance Sb on the radial bearing surface 7c side is increased in temperature by friction heat, and hence viscosity of the lubricating oil is low. In contrast, the lubricating oil which passes through the communication hole 22 and flows into the clearance Sa on the thrust bearing surface 7h is lower in temperature and higher in viscosity than the lubricating oil having flowed through the clearance Sb.

The mechanical loss increases when the viscosity of the lubricating oil is high. Therefore, the low-temperature lubricating oil which flows to the thrust bearing surface 7h from the communication hole 22 may be a factor of causing the increase in mechanical loss. When the another end 22b of the communication hole 22 is opened on the innermost side of the thrust bearing surface 7h in the radial direction of the shaft 8, the following effect is achieved. That is, being capable of securing a longer flow passage in which the low-temperature lubricating oil from the communication hole 22 is heated by mixing with the high-temperature lubricating oil from the clearance Sb. As a result, on the outer circumference side on which the circumference speed of the large-diameter portion 8a becomes higher, the temperature of the lubricating oil can be set higher. Therefore, the viscosity of the lubricating oil is reduced, thereby being capable of reducing the mechanical loss.

Figure 4A:
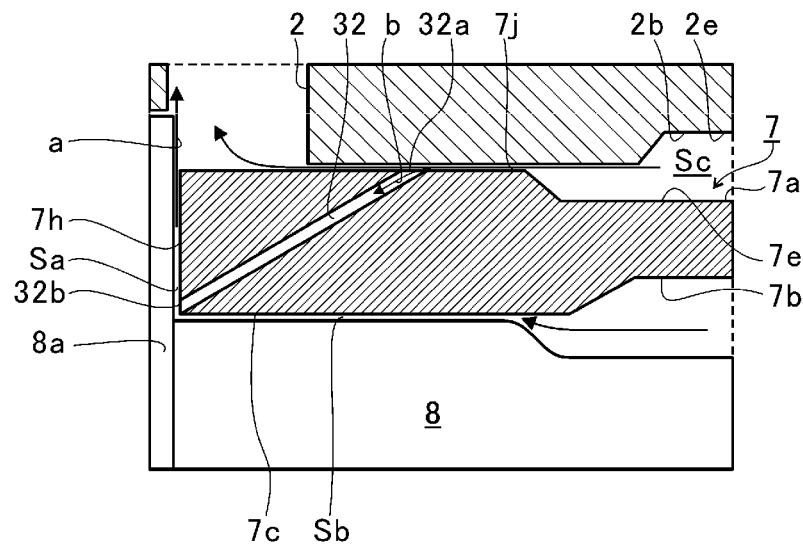
FIG. 4A is an extracted view of a part corresponding to FIG. 3 in a first modified example.
Figure 4B:
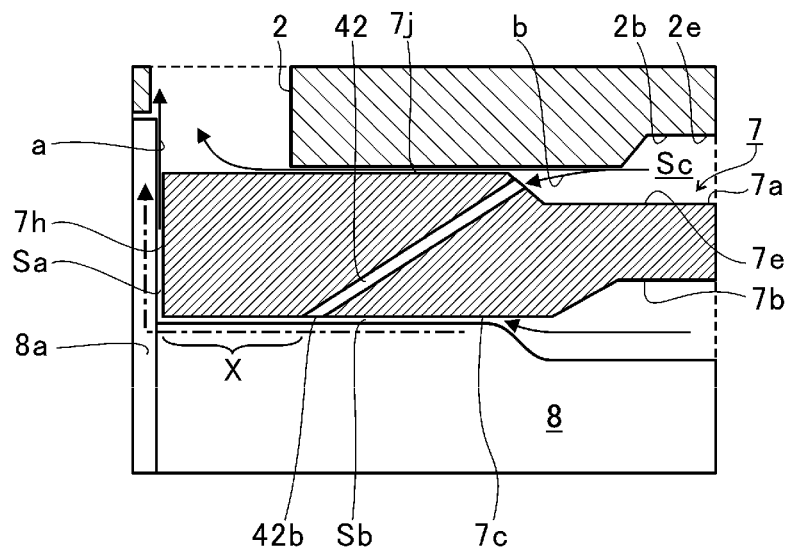
FIG. 4B is an extracted view of a part corresponding to FIG. 3 in a second modified example.

FIG. 4A is an extracted view of a part corresponding to FIG. 3 in a first modified example. FIG. 4B is an extracted view of a part corresponding to FIG. 3 in a second modification example.

As illustrated in FIG. 4A, in the first modification example, one end 32a of a communication hole 32 is opened in the damper portion 7j. Even in this case, similarly to the above-mentioned embodiment, a sufficient oil film thickness of the lubricating oil for lubricating the radial bearing surface 7c can be secured. Further, when the one end 32a of the communication hole 32 is opened in the damper portion 7j as illustrated in the first modification example, the following effect is achieved. That is, the lubricating oil having been increased in temperature in some sections of the damper portion 7j located in the vicinity of the one end 32a of the communication hole 32 is supplied to the thrust bearing surface 7h side. As a result, the mechanical loss on the thrust bearing surface 7h can be reduced. Further, when the one end 22a of the communication hole 22 is opened in the outer circumference surface 7e of the main body portion 7a on upstream of the damper portion 7j in the flow direction of the lubricating oil as in the above-mentioned embodiment, the following effect is achieved. That is, an area of the damper 7j is not reduced by the communication hole 22. Therefore, while the performance of the damper portion 7j is maintained, a sufficient oil film thickness of the lubricating oil on the radial bearing surface 7c can be secured.

Further, as in the second modification example illustrated in FIG. 4B, another end 42b of a communication hole 42 may be opened in the radial bearing surface 7c. Even in this case, similarly to the above-mentioned embodiment, a sufficient oil film thickness of the lubricating oil for lubricating the radial bearing surface 7c can be secured. Further, the lubricating oil having been increased in temperature in some sections of the radial bearing surface 7c is supplied to the thrust bearing surface 7h. As a result, the mechanical loss on the thrust bearing surface 7h can be reduced.

As described above, description has been made of the embodiment with reference to the attached drawings. However, as a matter of course, the present disclosure is not limited to the above-mentioned embodiment. It is apparent that a person skilled in the art could have easily been conceived of various examples of changes and corrections within the scope of claims, and it is to be understood that, as a matter of course, those changes and corrections fall within the technical scope.

For example, in the embodiment and the modification examples mentioned above, description is made of the case in which the another end 22b, 32b, 42b of the communication hole 22, 32, 42 is opened in the thrust bearing surface 7h or the radial bearing surface 7c. However, the another end 22b, 32b, 42b of the communication hole 22, 32, 42 may be opened between the thrust bearing surface 7h and the radial bearing surface 7c. That is, the another end 22b, 32b, 42b of the communication hole 22, 32, 42 may extend over the thrust bearing surface 7h and the radial bearing surface 7c.

Further, in the embodiment and the modification examples mentioned above, description is made of the case in which the structure on the thrust bearing surface 7h side arranged on the turbine impeller 9 side and the structure on the thrust bearing surface 7i side arranged on the compressor impeller 10 side are substantially the same. Further, in the embodiment and the modification examples mentioned above, description is made of the case in which the communication hole 22, 32, 42 is formed on both of the thrust bearing surface 7h side and the thrust bearing surface 7i side. However, it is only necessary that the communication hole 22, 32, 42 be formed on any one of the thrust bearing surface 7h side and the thrust bearing surface 7i side.

Further, in the embodiment and the first modification example mentioned above, description is made of the case in which the another end 22b, 32b of the communication hole 22, 32 is opened on the innermost side of the thrust bearing surface 7h in the radial direction of the shaft 8. However, the another end 22b, 32b of the communication hole 22, 32 may be opened at any position in the thrust bearing surface 7h.

Further, in the embodiment and the modification examples mentioned above, description is made of the case in which the communication hole 22, 32, 42 is formed on the upper side of the main body portion 7a in the drawings (oil passage 2c side). However, the communication hole 22, 32, 42 may be formed at any position in the circumferential direction of the main body portion 7a. Further, the arrangement, the size, and the number of the communication hole 22, 32, 42 may suitably be set in accordance with, for example, an operation condition of an engine. For example, the communication hole 22, 32, 42 may be arranged at only one location. In this case, the time required for processing of the communication hole 22, 32, 42 can be reduced. Further, a plurality of communication holes 22, 32, 42 may be arranged at, for example, two locations, three locations, or six locations at equal intervals in the circumferential direction of the main body portion 7a. In this case, evenness of the oil film thickness of the lubricating oil in the circumferential direction on the thrust bearing surface 7h side can be improved. Further, for example, in order to set the oil film thickness of the lubricating oil on the thrust bearing surface 7h to be uniform as much as possible, in consideration of the rotation direction of the shaft 8 and the centrifugal force, the plurality of communication holes 22, 32, 42 may be arranged at uneven intervals rather than equal intervals in the circumferential direction. Further, the cross-sectional shape of the communication hole (cross-sectional shape perpendicular to the flow of the lubricating oil) is not limited to the circular shape, and may be, for example, an elliptical shape or a polygonal shape.

INDUSTRIAL APPLICABILITY

The present disclosure is applicable to a bearing structure supporting a shaft, and a turbocharger.

What is claimed is:

1. A bearing structure, comprising:
a housing having a bearing hole;
a main body portion, which is provided in the bearing hole, and receives a shaft inserted to the main body portion;
a damper portion formed on an outer peripheral surface of the main body portion;
a radial bearing surface formed on an inner peripheral surface of the main body portion;
a thrust bearing surface formed on one end surface of the main body portion in an axial direction of the shaft;
an oil hole, which is formed on a side of the main body portion opposite to the thrust bearing surface with respect to the radial bearing surface, and penetrates from the inner peripheral surface of the main body portion to the outer peripheral surface of the main body portion; and
a communication hole, which has one end opened in a gap between the outer peripheral surface of the main body portion and an inner peripheral surface of the bearing hole or in the damper portion, and has another end opened on only an innermost side of the thrust bearing surface in a radial direction of the shaft.

2. The bearing structure according to claim 1, further comprising an oil passage, which is formed in the housing, is opened in the bearing hole, and is formed at a position closer to the oil hole in the axial direction of the shaft with respect to the radial bearing surface.

3. The bearing structure according to claim 2, wherein the oil passage is opposed to at least a part of the oil hole.

4. The bearing structure according to claim 3, wherein the one end of the communication hole is opened at a position of the main body portion separated apart from the thrust bearing surface with respect to the damper portion.

5. The bearing structure according to claim 2, wherein the one end of the communication hole is opened at a position of the main body portion separated apart from the thrust bearing surface with respect to the damper portion.

6. The bearing structure according to claim 1, wherein the one end of the communication hole is opened at a position of the main body portion separated apart from the thrust bearing surface with respect to the damper portion.

7. A turbocharger, comprising the bearing structure according to claim 1.

8. The bearing structure according to claim 1, wherein the damper portion communicates with the gap.

9. The bearing structure according to claim 1, wherein the communication hole is arranged at only one location in a circumferential direction of the main body portion.

* * * * *